US006412691B1

(12) United States Patent
Shiobara et al.

(10) Patent No.: US 6,412,691 B1
(45) Date of Patent: Jul. 2, 2002

(54) ELECTRONIC TRANSACTION APPARATUS

(75) Inventors: Tomomi Shiobara; Shigeru Hashimoto; Tsuyoshi Niwata, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 135 days.

(21) Appl. No.: 09/637,211

(22) Filed: Aug. 14, 2000

Related U.S. Application Data

(63) Continuation-in-part of application No. 09/327,571, filed on Jun. 8, 1999, now Pat. No. 6,135,351.

(30) Foreign Application Priority Data

Nov. 9, 1998 (JP) ........................................ 10-317508
Nov. 4, 1999 (JP) ........................................ 11-313472

(51) Int. Cl.[7] ................................................ G06F 5/00
(52) U.S. Cl. ...................................... 235/380; 235/379
(58) Field of Search ................................ 235/379, 380

(56) References Cited

U.S. PATENT DOCUMENTS 6,135,351 A * 10/2000 Shiobara et al. ............ 235/380

* cited by examiner

*Primary Examiner*—Harold I. Pitts
(74) *Attorney, Agent, or Firm*—Armstrong, Westerman & Hattori, LLP.

(57) ABSTRACT

There is provided an electronic transaction apparatus (e.g., an electronic money terminal) for processing a transaction engaged in by parties facing each other during which one party (a customer) confirms transaction information entered by the other party (a waiter), the direction in which the transaction information is displayed on a display unit of the apparatus is automatically reversed. As a result, the screen display can be directed towards the party (the customer) who must confirm transaction information without the electronic transaction apparatus being physically reversed.

2 Claims, 7 Drawing Sheets

ELECTRONIC TRANSACTION APPARATUS

This application is a continuation-in-part of prior application Ser. No. 09/327,571 filed Jun. 8, 1999 now U.S. Pat. No. 6,135,351.

BACKGROUND OF THE INVENTION

1. Field of the Invention

The present invention relates to an electronic transaction apparatus for processing a plurality of processes to perform inter-party transactions, and in particular to a so-called electronic money terminal used for transactions involving money.

2. Related Arts

Presently in use is an IC card, in which is embedded an IC chip on which money data is recorded, which is employed for electronic money transactions, the stored money data being applied for the settlement of an account. Also in wide use today, for an electronic transaction which involves the transfer of money, is an electronic transaction apparatus, i.e., a so-called electronic money terminal, which reads money data from the IC chip in an IC card, and after altering the money data in accordance with the terms of a money transaction, writes the altered data to the IC chip.

FIG. 8 is a schematic diagram illustrating a conventional electronic money terminal. In FIG. 7, an electronic money terminal 100 is a portable terminal comprising an entry operation unit (e.g., number keys) 1, for entering a money value; a display unit (e.g., a liquid crystal display panel) 3, on which the entered money value is displayed; and a card slot 4, into which an IC card can be inserted. An explanation will now be given for a case wherein a waiter, at a table in a certain restaurant, uses such an electronic money terminal for a customer who settles a bill.

FIGS. 9A and 9B are specific top views of a situation wherein a waiter at a restaurant uses an electronic money terminal to enter the charges for a bill. In FIG. 9A, two customers, A and B, are seated opposite each other at a table. After the customers have completed their meal, the waiter positions himself beside the table, to settle , whereupon customer A turns so that he and the waiter face each other. From customer A the waiter receives an IC card which he loads into the electronic money terminal 100. Then, the waiter enters a payment amount and the entered amount is exhibited on the display of the terminal 100.

As is shown in FIG. 9B, to confirm the entry the waiter shows customer A the payment amount exhibited on the display screen. At this time, the waiter must reverse the electronic money terminal 100 so that it can be easily seen by the customer. If, when presented, the electronic money terminal 100 is not reversed, for customer A the screen display will be upside down and will be difficult to read.

Thereafter, to confirm and accept the amount of the payment exhibited on the display, the customer presses a predetermined confirmation key, and subsequently, an electronic transaction process is initiated by the electronic money terminal. That is, an amount equivalent to the payment is subtracted from the money data held by the IC card of customer A, and that amount is recorded in the electronic money for transfer to the account of the restaurant.

In the above described process, wherein the settlement is performed by parties (a customer and a waiter) who face each other while using the screen of an electronic money terminal, the electronic money terminal must be reversed each time the screen display is to be read by one of the parties, and this is inconvenient.

To eliminate the need for reversing the electronic money terminal, on an electronic money terminal a plurality of screens could be provided for a customer and a waiter, but this would make the electronic money terminal more complicated, and would be accompanied by an increase in the manufacturing costs.

SUMMARY OF THE INVENTION

It is, therefore, one objective of the present invention to provide an electronic transaction apparatus which, without being reversed and while using only one screen, can provide for each of two facing parties a screen display which both parties can easily see.

To achieve the above objective, according to the present invention, it is provided an electronic transaction apparatus for processing a plurality of processes to perform a transaction between a first party and a second party comprising:

- a first operating unit for entering a first transaction information by the first party;
- a display unit for displaying the first transaction information entered at the first operating unit toward the first party; and
- a control unit for controlling display direction of the display unit toward the second party for displaying a confirmation information for confirming the first transaction information at the process of confirming the first transaction information by the second party.

Therefore, the first party can provide for the second party an easily visible display of transaction information, without the electronic transaction apparatus having to be reversed.

After entering a second transaction information by the second party at the process of confirming, the control unit may control the display direction of the display unit toward the first party, Further, the electronic transaction apparatus may comprises a second operating unit for entering a second transaction information by the second party at the process of confirming, and the second operating unit and the first operating unit are positioned facing each other.

With this arrangement, the second party performs the confirmation process without having to reverse the electronic transaction apparatus.

The transaction for which is required the electronic transaction apparatus is, for example, is a money transaction in which the second party pays money to the first party, and the transaction information is a transaction price.

DETAILED DESCRIPTION OF THE PREFERRED EMBODIMENT

The preferred embodiment of the present invention will now be described. It should be noted, however, that the technical scope of the present invention is not limited to this embodiment.

Figure 1:
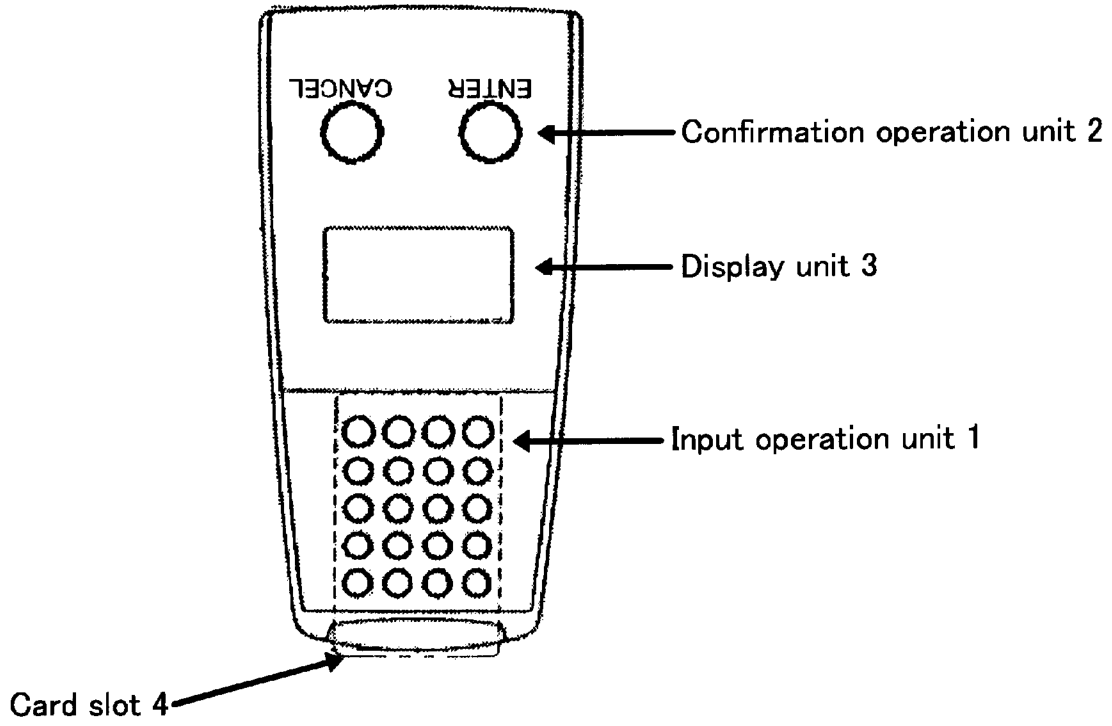
FIG. 1 is a schematic diagram illustrating an electronic transaction apparatus according to one embodiment of the present invention.

FIG. 1 is a schematic diagram illustrating an electronic transaction apparatus according to the embodiment of the present invention. In FIG. 1, the electronic transaction apparatus is a portable electronic money terminal, which comprises, as does the terminal described in FIG. 6, an entry operating unit 1 (e.g., number keys) used by a waiter when entering a numerical value, such as an amount of money; a display unit 3 (e.g., a liquid crystal panel) in which is displayed the amount that is entered; and a card slot 4 into which the IC card of a customer can be inserted. In this embodiment of the present invention, the electronic transaction apparatus further comprises a confirmation operating unit 2, which includes the confirmation keys (an ENTER key and a CANCEL key) which are located at the top of the liquid crystal panel 3 and which a customer may press. It should be noted that an IC card for a store is incorporated in the apparatus in advance.

When, during a sequential process which is performed by a waiter and a customer, the waiter must obtain a confirmation operation by the customer to a operation by the waiter, the display direction of the screen is inverted, so that without reversing the apparatus he or she can provide a screen which is easy for the customer to see.

Figure 2:
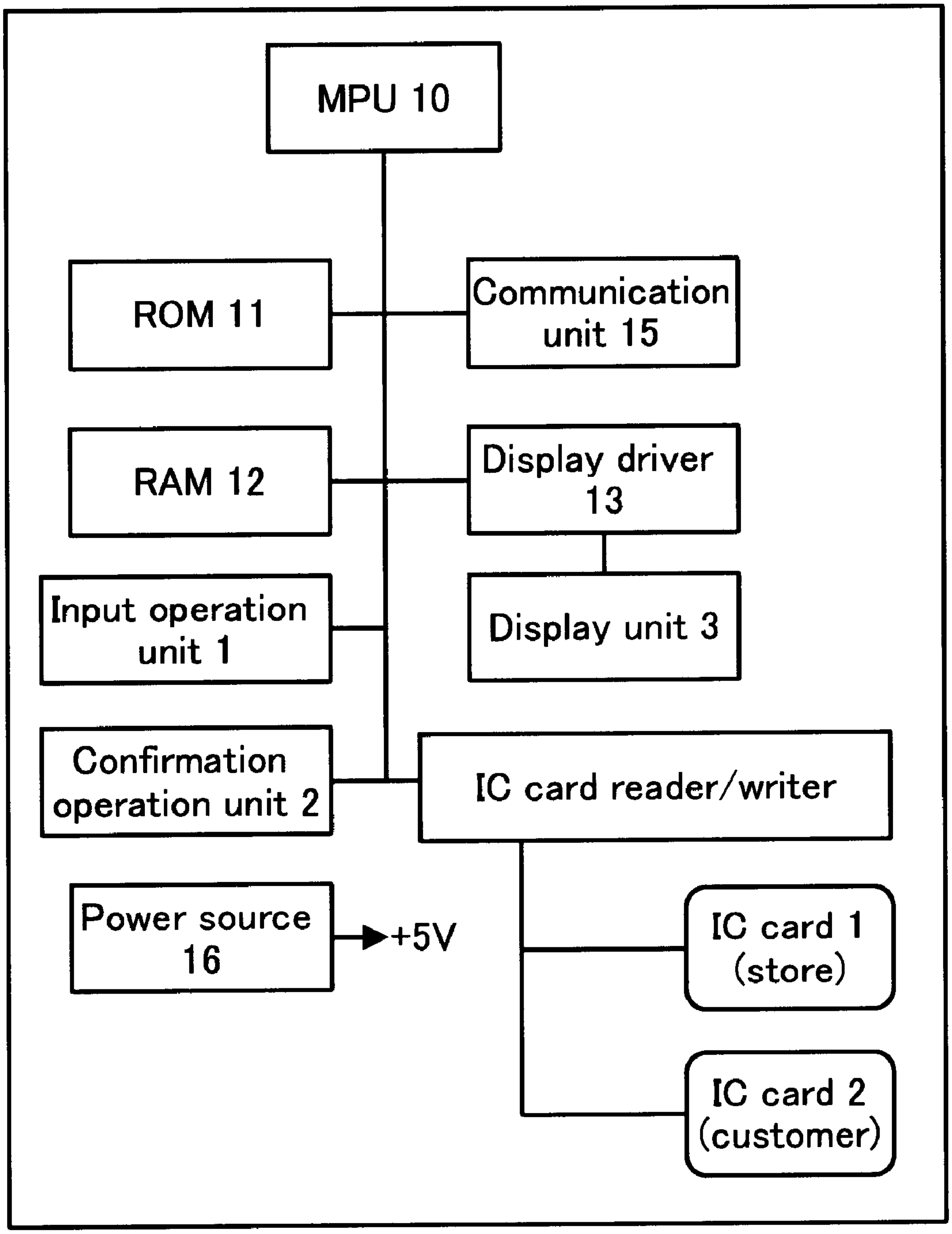
FIG. 2 is a block diagram illustrating the arrangement of the electronic transaction apparatus according to the embodiment of the present invention.

FIG. 2 is a block diagram illustrating the arrangement of the electronic transaction apparatus shown in FIG. 1. In FIG. 2, in accordance with signals received from the entry operating unit 1 and the confirmation operating unit 2, an MPU 10 reads a transaction program from a ROM 11, writes it in a RAM 12 and then executes it, and a display driver 13 drives the display unit 3 in accordance with an instruction received from the MPU 10. Further, in accordance with an instruction received from the MPU 10, reads or rewrites money data recorded an IC card reader/writer 14 on a store IC card and a customer IC card which are loaded.

A communication unit 15 is, for example, a modem, by which the electronic transaction apparatus is connected, for example, to the host computer of a bank via a public telephone line network. The communication unit 15 may be an RS232C interface, and be connected to a personal computer or to another electronic transaction apparatus. A voltage of 5 V is supplied to the electronic transaction apparatus by a power supply 16, which, for example, is constituted by a battery.

Figure 3:
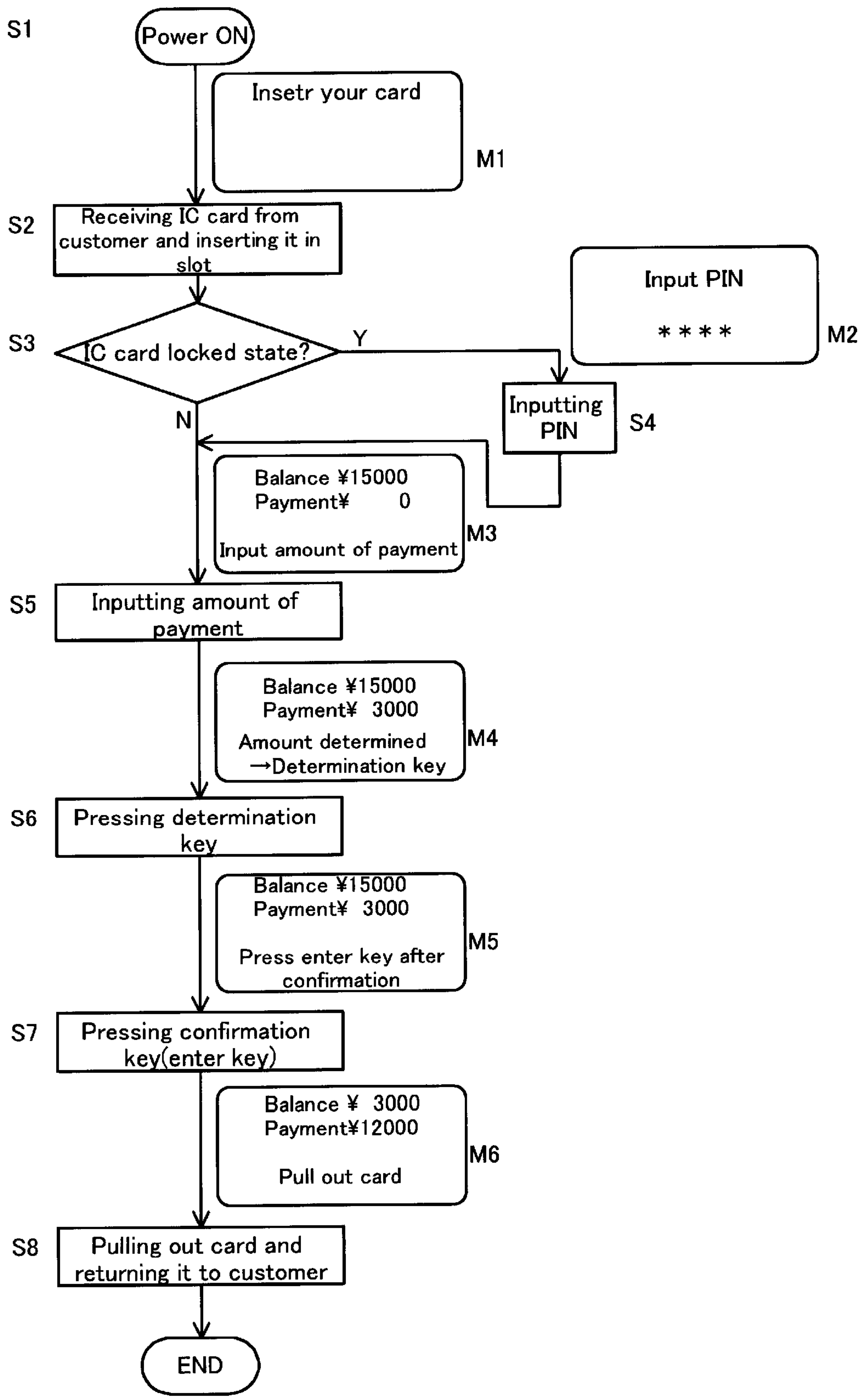
FIG. 3 is a flowchart for the transaction processing performed according to the embodiment of the present invention, and display screen examples which are provided for each of the processes performed during the transaction.
Figure 4:
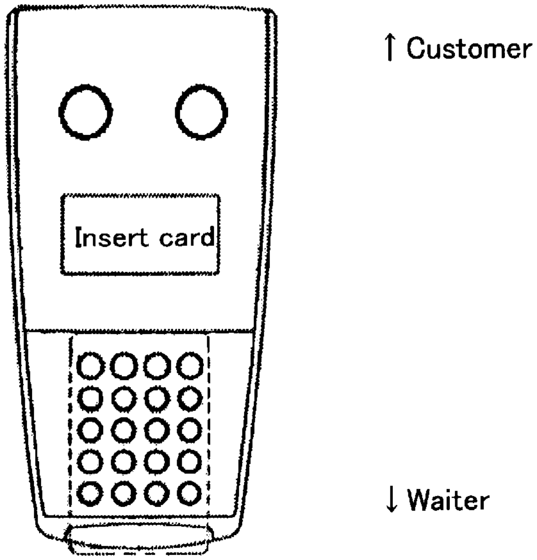
FIG. 4 is a diagram showing the direction in which message M1 in FIG. 3 is displayed.
Figure 5:
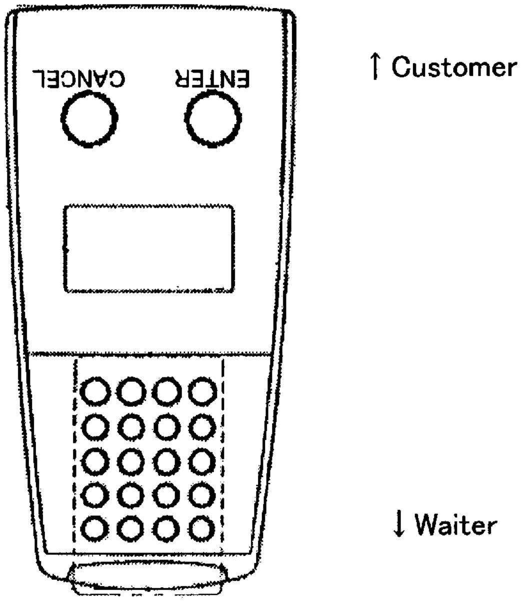
FIG. 5 is a diagram showing the direction in which message M5 in FIG. 3 is displayed.
Figure 6:
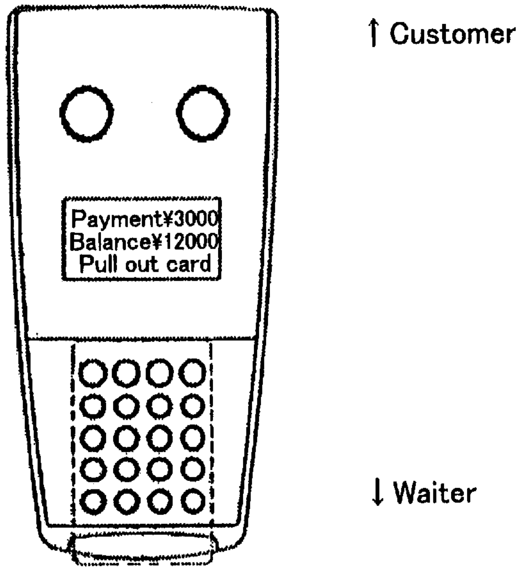
FIG. 6 is a diagram showing the direction in which message M6 in FIG. 3 is displayed.

FIG. 3 is a flowchart showing the transaction processing according to the embodiment of the present invention, and screen examples which are displayed on the display unit 3 for individual transaction processes, and FIGS. 4 to 6 are diagrams used to explain the direction in which the screen display of the display unit 3 is presented during the separate transaction processes. The processing shown in the flowchart in FIG. 3 will now be described while referring to FIGS. 4 to 6.

First, when power is turned on at step S1, message M1, "Insert your card," is displayed on the screen.

FIG. 4 is a diagram showing the direction in which the message Ml is displayed. At this time, message M1 is displayed so that it faces the waiter. In this state, the entry operating unit 1, which includes the number keys, is directed toward the waiter, while the confirmation operating unit 2 is directed toward the customer.

Subsequently, the waiter receives from the customer an IC card and inserts it in the slot 4 (step S2), and the IC card reader/writer 14 begins to read the money data (balance) stored on the IC card. When, at this time, it is determined that the IC card is locked (step S3) and that the money data can not be read, message M2, requesting that a personal ID number (PIN) be entered so that the IC card can be unlocked, is presented on the display unit 3. The PIN must be entered using the entry operating unit 1, in which are arranged number keys and other keys, and it is preferable that when entering the PIN the customer be able to easily access the entry operating unit 1. Thus, message M2, as well as message M1 (FIG. 4), is displayed toward the waiter, so that the waiter can reverse the electronic transaction apparatus, directing towards the customer the entry operating unit 1 wherein the number keys, etc., are arranged. The customer then uses the number keys to enter his or her PIN and thereby places the IC card in the unlocked state. After the PIN has been entered, the waiter turns the electronic transaction apparatus so that it is positioned as is shown in FIG. 4.

In the unlocked state, message M3, which shows the available balance and which requests the entry of the amount to be paid, is displayed. Message M3, as well as message M1 (FIG. 4), is presented toward the waiter.

The waiter then depresses specific number keys in the entry operating unit 1 and enters the amount of the payment (S5), which is displayed on the screen as message M4. This message is also directed to the waiter. After the waiter has completed the entry of the amount of the payment, he or she presses a determination key provided in the entry operating unit 1. Since the number of digits contained in an amount that is entered value may differ each time the accounting process is performed, generally, the amount which is entered be determined by pressing the determination key. After the determination key had been depressed, the MPU 10 acknowledges the end of the entry for the payment.

In this embodiment, when the determination key is pressed, the MPU 10 assumes control of the display driver 13 and reverses the direction of the screen display, and publishes message M5, requesting confirmation of the amount of the payment.

FIG. 5 is a diagram showing the direction in which message 5 is displayed. As is shown in FIG. 5, for the transaction process during which a customer confirms the amount of a payment entered by the waiter, for the confirmation, message M5 is automatically reversed and displayed, so that the customer, who is facing the waiter, can easily see the amount of the payment.

As a result, when the amount of the payment is provided for the customer for confirmation, the waiter can present the payment display to the customer without having to reverse the electronic transaction apparatus.

When the customer agrees with the payment quoted in message M5, he or she depresses the confirmation key (ENTER key) in the confirmation operating unit 2 (step S7). The IC card reader/writer 14 then performs a money data transaction to transfer an amount equivalent to the amount of the payment from the IC card of the customer to the IC card of the store.

As is shown in FIG. 5, since the confirmation operating unit 2 in this embodiment is so located that it is opposite the entry operating unit 1, the display unit 3 being located between the two, the waiter does not have to reverse the electronic transaction apparatus when requesting that the customer press the confirmation key. Then, when the customer has confirmed the amount and has accepted it, the waiter can press the confirmation key.

When the confirmation key is pressed at step S7, the screen is again reversed so that it is toward the waiter, and message 6 is displayed, which indicates that the accounting process has been terminated.

FIG. 6 is a diagram of a display in which message M6 is shown. That is, when the confirmation process has been completed, the direction in which the message is presented is automatically returned to the original direction. At step S8, the waiter unloads the customer's IC card and returns it.

As is described above, according to the embodiment of the present invention, when a waiter and a customer who are facing each other participate in a transaction (e.g., an accounting settlement), the direction in which the screen display is presented on the display unit 3 is automatically reversed during a process performed to confirm an amount of money (transaction information) which is entered by the waiter. More specifically, a specific button for reversing the screen, or a special operation by which the screen is reversed, is not required for the electronic transaction apparatus of this embodiment. At the time of a confirmation process, which is a response operation performed by a customer and is one of a series of processes, the direction in which the screen display of the display unit 3 is presented is automatically reversed. That is, when the amount of a payment is entered by a waiter, the MPU 10 determines that the next process to be performed is the confirmation of the payment by the customer, and automatically reverses the direction in which the screen display is presented.

As is explained at step S4 in FIG. 4, the process during in which a customer enters a PIN is generated by as a result of the process during which a card is inserted by a waiter. Therefore, since the entry of the PIN by the customer is only an operation performed in response to the operation performed by the waiter and as such is not a confirmation operation, the screen display is not reversed.

Figure 7:
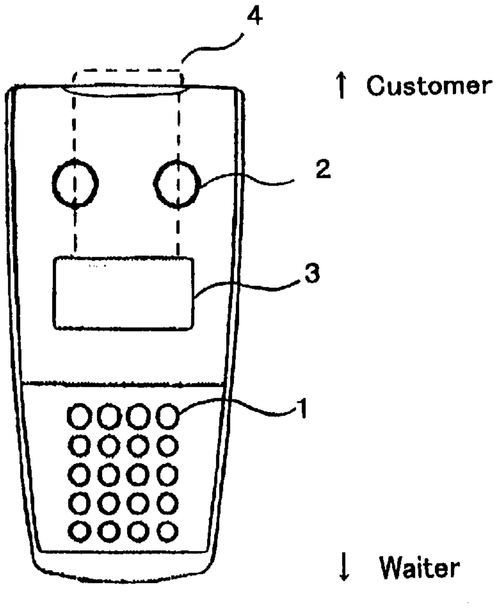
FIG. 7 is a diagram showing the arrangement of an electronic transaction apparatus according to another embodiment of the present invention.
Figure 8:
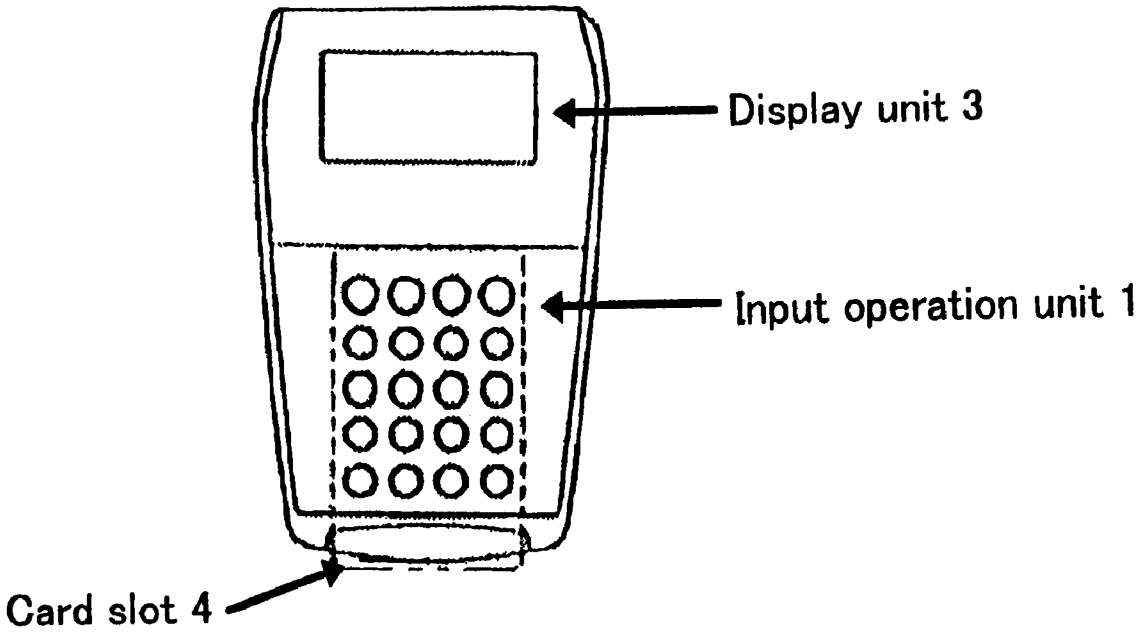
FIG. 8 is a schematic diagram illustrating a conventional electronic money terminal.
Figure 9A:
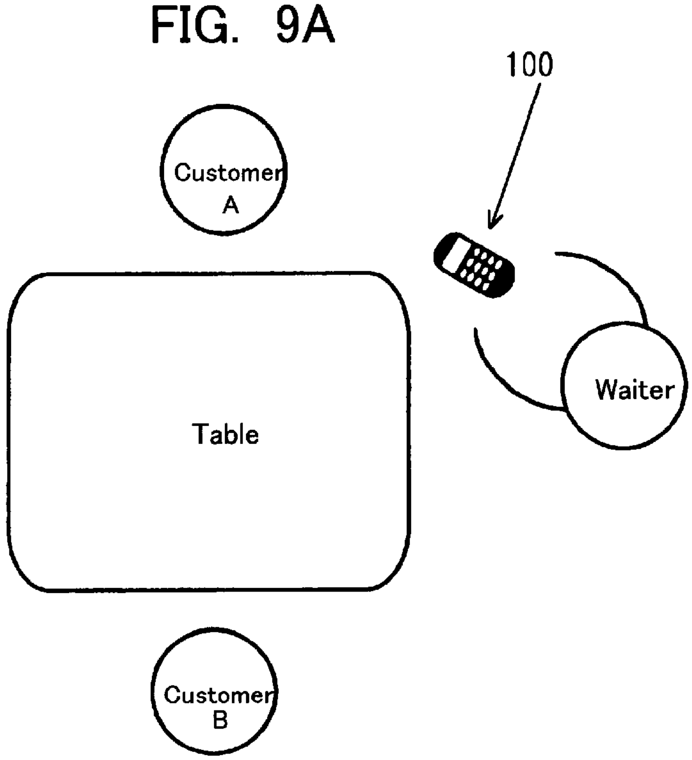
FIGS. 9A and 9B are specific top views of a situation wherein a waiter in a restaurant employs an electronic money terminal to perform a collection process for a bill owed by a customer seated at a table.
Figure 9B:
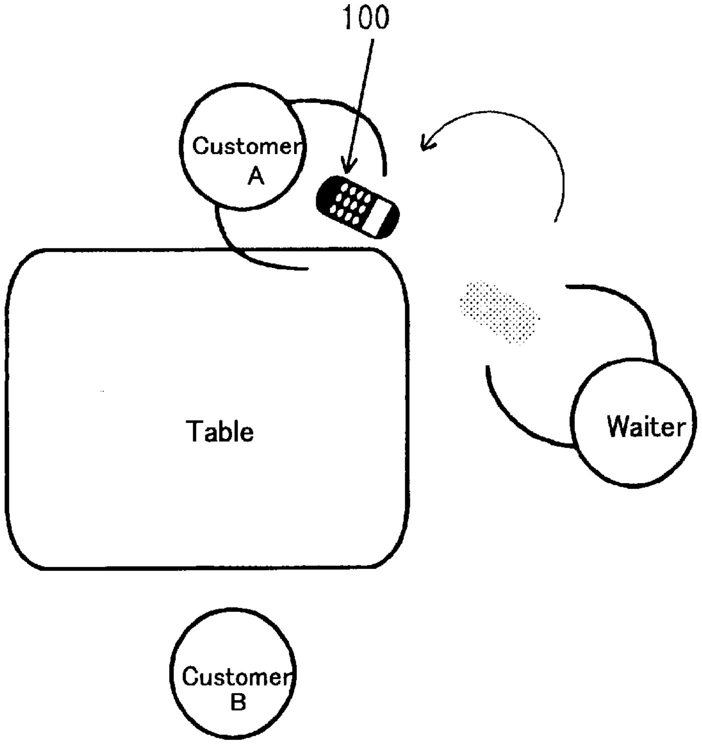

FIG. 7 is a diagram showing the arrangement of an electronic transaction apparatus according to another embodiment of the present invention. In addition to the arrangement of the electronic transaction apparatus in FIG. 1, a card slot 4 for inserting the IC card of a customer is provided which opens toward the customer. At step S3 in FIG. 3, a customer inserts his or her IC card in the card slot 4, and at step S8, the customer removes the IC card from the card slot 4.

Therefore, in this embodiment, the customers need not hand their IC cards to clerks, and can themselves insert or remove them. Thus, since only the customers handle the IC cards, the sense of uneasiness that customers experience when their IC cards are handled by others (clerks), even for a moment, can be dispelled.

Further, the direction of display of the screen may be inverted by depressing a specific key button. For example, this function may be provided for one of the number keys on the input operation unit 1 in FIG. 1 or 7. Thus, at a time other than when the confirming operation of the payment by the customer, the display direction of the screen can be inverted. For example, when an error (e.g., a balance shortage) occurs during a transaction, a clerk can depress the specific key button to change the display direction of the screen displaying the error contents toward the customer.

The electronic transaction apparatus in this embodiment is applied for an electronic money terminal. However, the application of the electronic transaction apparatus is not thereby limited, but can be employed for any apparatus used for a process during which one screen is jointly employed by parties who face each other.

As is described above, according to the present invention, when the electronic transaction apparatus (e.g., an electronic money terminal) is employed to perform a transaction engaged in by parties who face each other (a waiter and a customer) during the performance of one process, of a plurality of processes, during which one party (a customer) confirms transaction information entered by the other party (a waiter), the direction in which the transaction information is displayed on the display unit of the apparatus is automatically reversed. As a result, the screen display, when presented, can be directed towards the party (the customer) who must confirm transaction information without the electronic transaction apparatus being physically reversed.

In addition, since the confirmation key for confirming the transaction information is positioned in face of the input keys used to enter transaction information, the electronic transaction apparatus need not be physically reversed even when one party enters transaction information and the other party must depress the confirmation key later.

The present invention may be embodied in other specific forms without departing from the spirit or essential characteristics thereof. The present embodiment is therefore to be considered in all respects as illustrative and not restrictive, the scope of the invention being indicated by the appended claims rather than by foregoing description and all change which come within the meaning and range of equivalency of the claims are therefore intended to be embraced therein.

What is claimed is:

1. An electronic transaction apparatus for processing a plurality of processes to perform a transaction between a first party and a second party comprising:

a first operating unit for entering a transaction information by the first party;

a second operating unit for performing a confirming operation by the second party, the second operating unit and the first operating unit being positioned facing each other;

a display unit for displaying the transaction information, the display unit being positioned between the first operating unit and the second operating unit;

a card slot for inserting a card storing data for performing the transaction by the second party, the card slot being positioned at the side of the second operating unit; and a control unit for determining whether to display the transaction information toward the first party or toward the second party.

2. An electronic transaction apparatus for processing a plurality of processes to perform a transaction between a first party and a second party comprising:

a first operating unit for entering a transaction information by the first party;

a display unit for displaying the transaction information toward the first party;

a key button for directing to change the display direction of the transaction information displayed on the display unit toward the second party; and a control unit for displaying the transaction information toward the second party based on depressing of the key button.

* * * * *